（12）United States Patent
Phillips

(10) Patent No.: US 9,714,673 B2
(45) Date of Patent: Jul. 25, 2017

(54) CONNECTOR ASSEMBLY FOR AN ARTICLE OF FURNITURE

(75) Inventor: Sean Phillips, Newry (GB)

(73) Assignee: OVVO LIMITED, Dundalk, County Louth (IE)

( * ) Notice: Subject to any disclaimer, the term of this patent is extended or adjusted under 35 U.S.C. 154(b) by 968 days.

(21) Appl. No.: 13/979,287

(22) PCT Filed: Jan. 11, 2012

(86) PCT No.: PCT/EP2012/050370
§ 371 (c)(1),
(2), (4) Date: Jul. 11, 2013

(87) PCT Pub. No.: WO2012/095454
PCT Pub. Date: Jul. 19, 2012

(65) Prior Publication Data
US 2013/0287484 A1    Oct. 31, 2013

(30) Foreign Application Priority Data

Jan. 14, 2011   (GB) .................................. 1100622.8
Jul. 15, 2011   (GB) .................................. 1112225.6

(51) Int. Cl.
*F16B 12/24*    (2006.01)
*A47B 47/00*    (2006.01)
(Continued)

(52) U.S. Cl.
CPC .......... *F16B 12/24* (2013.01); *A47B 47/0025* (2013.01); *A47B 47/042* (2013.01);
(Continued)

(58) Field of Classification Search
CPC ............... Y10T 403/559; Y10T 403/55; Y10T 403/7176; Y10T 24/42; Y10T 24/45571;
(Continued)

(56) References Cited

U.S. PATENT DOCUMENTS 916,995 A * 4/1909 Carr ........................ F16B 5/125
24/623
2,937,834 A * 5/1960 Orenick .................... F16L 3/14
174/40 CC
(Continued)

FOREIGN PATENT DOCUMENTS

DE  7231950 U   12/1972
EP  1374737 A1   1/2004
FR    86990 E    5/1966

OTHER PUBLICATIONS

International Search Report of the International Searching Authority from corresponding Patent Cooperation Treaty (PCT) Application No. PCT/EP2012/050370, mailed Feb. 20, 2012.

*Primary Examiner* — James Ference
(74) *Attorney, Agent, or Firm* — Gardner, Linn, Burkhart & Flory, LLP

(57) ABSTRACT

A connector assembly for connecting the free ends of the adjacent panels of a ready to assemble article of furniture together when assembled, said connector assembly comprising a male connector having opposite ends insertable into respective opposing receiving apertures provided in adjacent ends of the panels, each end of said male connector being provided with retaining means to retain the ends of the male connectors in said respective apertures and a ready to assemble article of furniture comprising a plurality of substantially rigid panels attached together end to end, the ends of the panels being bevelled or otherwise shaped such that the panels can be folded to bring said ends into abutting relationship to define a polygonal article, wherein said panels are attached together by means of a flexible sheet material extending between the panels.

15 Claims, 13 Drawing Sheets

(51) Int. Cl.
*F16B 12/26* (2006.01)
*A47B 47/04* (2006.01)
*A47B 87/00* (2006.01)
*A47B 87/02* (2006.01)

(52) U.S. Cl.
CPC ............ *A47B 87/008* (2013.01); *F16B 12/26* (2013.01); *A47B 87/0276* (2013.01); *A47B 2230/0062* (2013.01); *Y10T 403/559* (2015.01)

(58) Field of Classification Search
CPC ........ F16B 12/20; F16B 12/24; F16B 19/002; F16B 21/084; F16B 5/0028; F16B 21/082; F16B 12/088; F16B 5/0004
USPC ..... 403/397, 298, 292, 326; 52/586.1, 586.2
See application file for complete search history.

(56) References Cited

U.S. PATENT DOCUMENTS

| | | | | |
|---|---|---|---|---|
| 3,015,869 | A * | 1/1962 | Rapata | F16B 12/30 24/339 |
| 3,423,055 | A * | 1/1969 | Fisher | F16B 21/088 24/339 |
| 3,563,582 | A * | 2/1971 | Shroyer | E04B 1/6154 24/581.1 |
| 3,570,205 | A * | 3/1971 | Payne | E04B 1/6175 52/466 |
| 3,627,362 | A * | 12/1971 | Brenneman | E04B 1/49 411/460 |
| 3,732,659 | A * | 5/1973 | LaBarge | E04B 1/6803 52/204.597 |
| 3,760,547 | A * | 9/1973 | Brenneman | E04B 1/49 403/292 |
| 3,826,053 | A * | 7/1974 | Cameron | E04B 1/48 403/298 |
| 3,991,960 | A * | 11/1976 | Tanaka | F16L 3/23 24/458 |
| 4,143,577 | A * | 3/1979 | Eberhardt | F16B 21/088 174/138 D |
| 4,333,284 | A * | 6/1982 | Meadows | E06B 3/7001 160/179 |
| 4,454,699 | A * | 6/1984 | Strobl | F16B 21/082 403/298 |
| 4,455,715 | A * | 6/1984 | Matsui | F16B 21/088 24/16 PB |
| 4,457,482 | A * | 7/1984 | Kitagawa | F16L 3/23 248/73 |
| 4,564,163 | A * | 1/1986 | Barnett | F16L 3/12 24/16 PB |
| 4,599,841 | A * | 7/1986 | Haid | E04F 15/04 52/396.04 |
| 4,669,688 | A * | 6/1987 | Itoh | F16L 3/23 24/16 PB |
| 4,701,066 | A * | 10/1987 | Beam | A47B 96/20 403/298 |
| 4,784,358 | A * | 11/1988 | Kohut | F16L 3/137 24/16 PB |
| 4,795,116 | A * | 1/1989 | Kohut | F16B 21/086 24/16 PB |
| 4,813,883 | A * | 3/1989 | Staley | H01R 4/2416 439/391 |
| 4,840,345 | A * | 6/1989 | Neil | F16L 3/12 24/16 PB |
| D324,168 | S * | 2/1992 | Fujioka | D8/354 |
| D324,992 | S * | 3/1992 | Ono | D13/154 |
| D336,420 | S * | 6/1993 | Fujimoto | D8/354 |
| D336,604 | S * | 6/1993 | Fujimoto | D8/354 |
| 5,224,244 | A * | 7/1993 | Ikeda | F16L 3/233 24/16 PB |
| 5,230,257 | A * | 7/1993 | Nowak | F16C 1/14 248/71 |
| 5,333,822 | A * | 8/1994 | Benoit | F16L 3/233 24/16 PB |
| 5,694,730 | A * | 12/1997 | Del Rincon | E04B 1/6154 403/298 |
| 5,758,987 | A * | 6/1998 | Frame | F16B 21/082 24/297 |
| 5,771,650 | A * | 6/1998 | Williams | E04B 2/08 24/DIG. 41 |
| 5,791,113 | A * | 8/1998 | Glowa | E06B 1/08 403/298 |
| 5,833,480 | A * | 11/1998 | Austin | H01R 4/64 24/295 |
| 5,851,097 | A * | 12/1998 | Shereyk | F16B 5/065 411/508 |
| 6,036,398 | A * | 3/2000 | Theodorou | E04F 11/181 403/290 |
| 6,042,296 | A * | 3/2000 | Wittig | F16B 5/0642 24/297 |
| 6,186,698 | B1 * | 2/2001 | Knapp | F16B 5/002 403/326 |
| 6,617,009 | B1 * | 9/2003 | Chen | B29C 47/128 428/148 |
| 6,675,545 | B2 * | 1/2004 | Chen | B29C 47/0028 403/298 |
| 7,073,231 | B2 * | 7/2006 | Draggoo | B60R 13/0206 24/297 |
| 7,201,352 | B2 * | 4/2007 | Kawai | F16L 3/1075 24/543 |
| 7,444,792 | B2 * | 11/2008 | Matson | E04D 12/00 24/336 |
| 7,665,264 | B1 * | 2/2010 | Wolfe | E04B 1/14 52/586.2 |
| 2002/0031646 | A1 * | 3/2002 | Chen | B29C 47/0019 428/167 |
| 2004/0052575 | A1 * | 3/2004 | Draggoo | B60R 13/0206 403/298 |
| 2010/0254757 | A1 * | 10/2010 | Saul | A47C 4/02 403/404 |

* cited by examiner

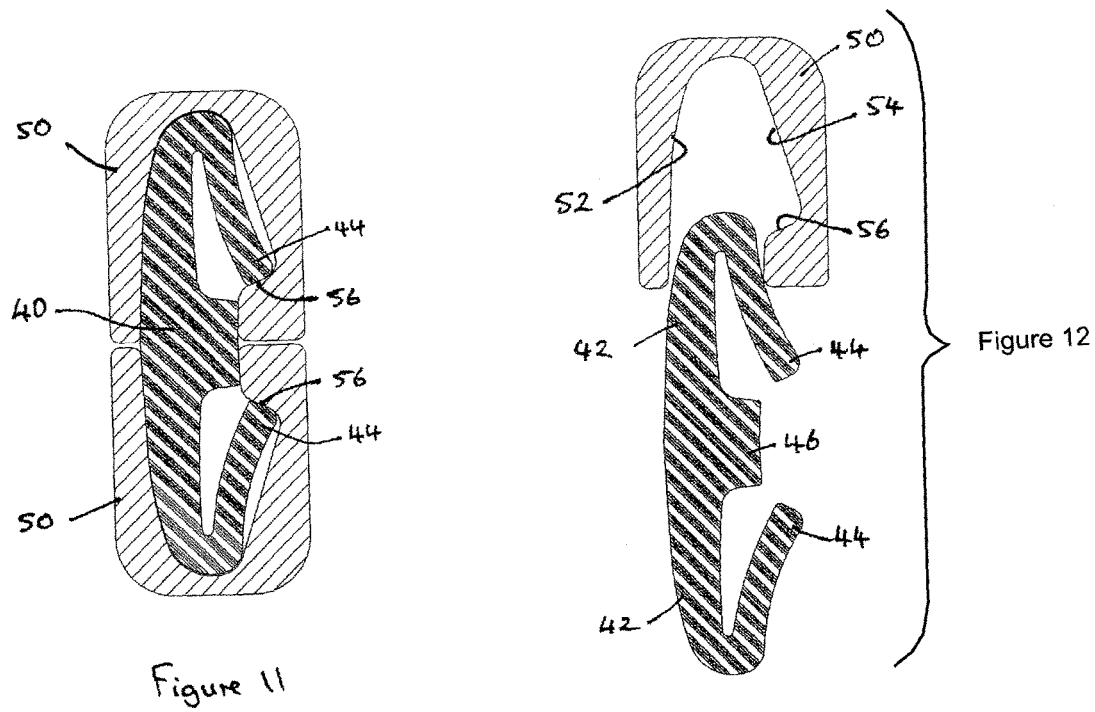
Figure 11
Figure 12
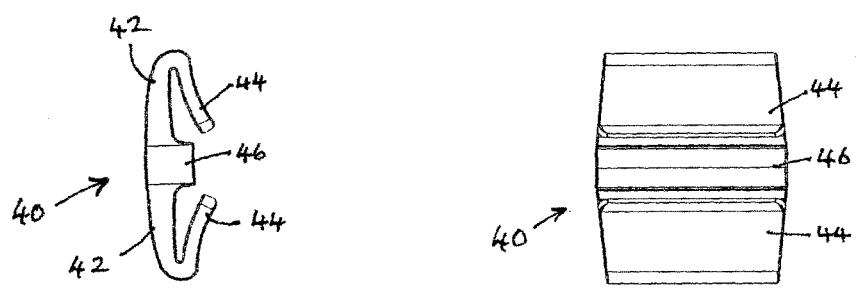
Figure 13a
Figure 13b
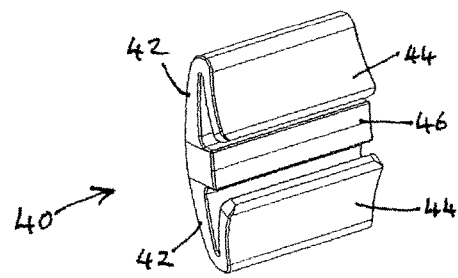
Figure 13c

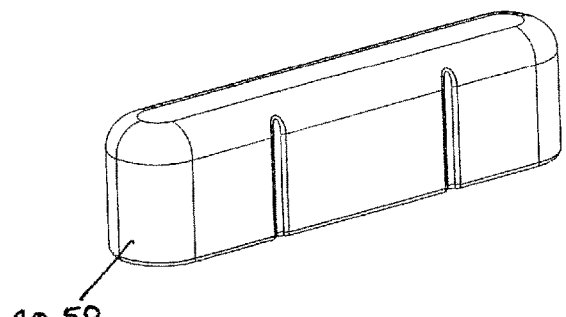
Figure 16
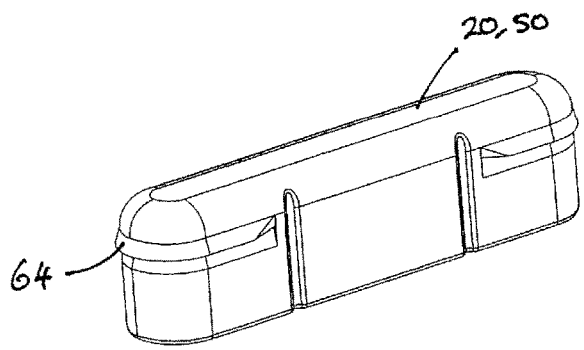
Figure 17
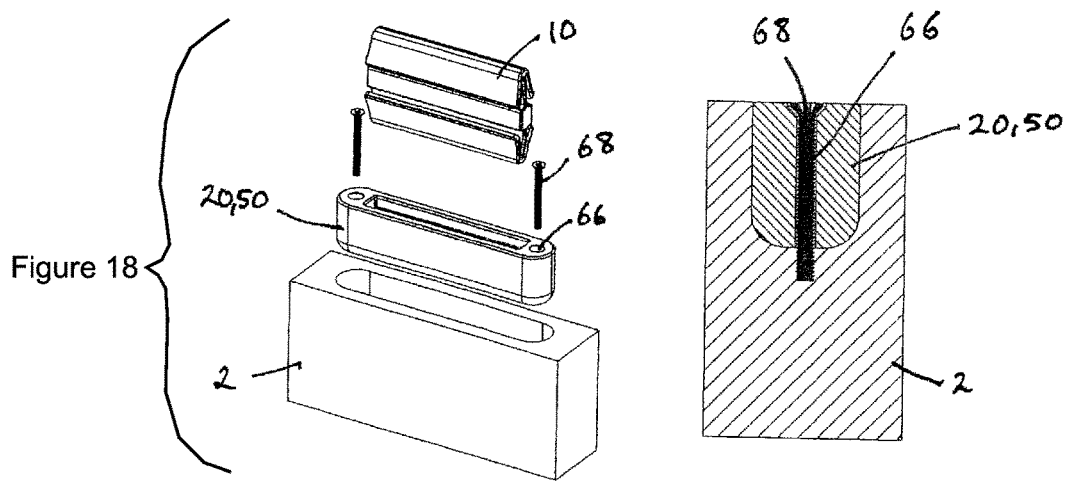
Figure 18
Figure 19

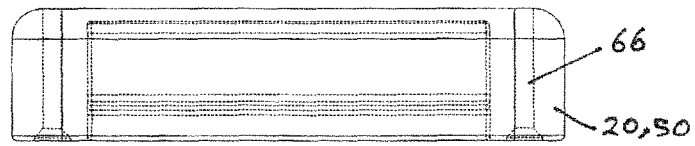
Figure 20
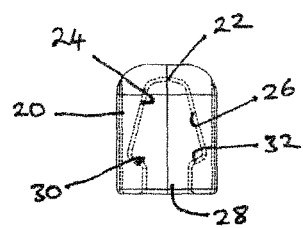 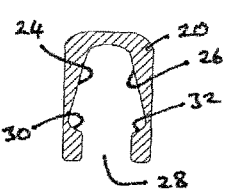 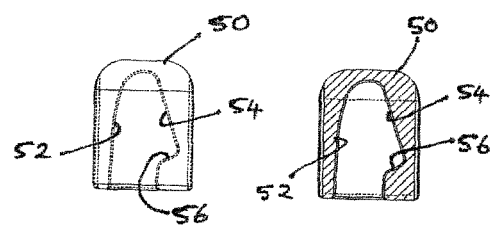 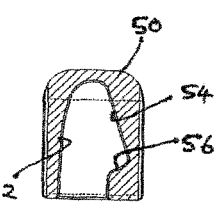
Figure 21a   Figure 21b   Figure 22a   Figure 22b
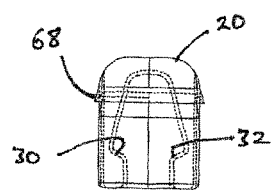 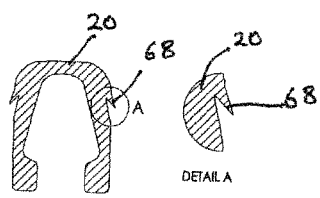
Figure 23a   Figure 23b   Figure 24

CONNECTOR ASSEMBLY FOR AN ARTICLE OF FURNITURE

FIELD OF THE INVENTION

This invention relates to a connector assembly for an article of furniture and a ready to assemble article of furniture, such as a storage unit, preferably utilising such connector assembly, that can be assembled without the use of tools.

BACKGROUND OF THE INVENTION

Ready to assemble furniture has been known in the furniture industry for many years. This type of furniture construction provides a number of advantages to the manufacturer, to the retailer, and to the customer. For example, as to the manufacturer, there are significant cost savings in manufacturing unassembled furniture over conventional fully assembled furniture. Ready to assemble furniture can be supplied flat packed, thus requiring less storage space for both the manufacturer and the retailer. The customer ultimately benefits the lower cost of ready to assemble furniture as opposed to pre-assembled furniture and the ease of transport of flat packed ready to assemble furniture.

Unlike conventional fully or pre-assembled furniture, ready to assemble furniture, as the name implies, requires assembly by the customer. This furniture often requires the use of tools by the customer to enable the manipulation of specialized fittings to assemble and secure the various components of the furniture together. The customers may not have the necessary tools or skill level to assemble the furniture properly. The failure to do so may result in the furniture being unstable, and potentially collapsing during use. It is therefore be desirable to provide ready to assemble furniture which can be assembled without the need for tools in a simple and efficient manner, while ensuring the integrity of the resulting assembled furniture.

SUMMARY OF THE INVENTION

According to a first aspect of the present invention there is provided a connector assembly for connecting the free ends of adjacent panels of a ready to assemble article of furniture together when assembled, said connector assembly comprising a male connector having opposite ends insertable into respective opposing receiving apertures provided in said adjacent ends of the panels, each end of said male connector being provided with retaining means to retain the ends of the male connectors in said respective apertures.

Preferably said retaining means comprises at least one resilient retaining member adapted to engage a shoulder within the respective receiving aperture to retain the male connector therein.

Said receiving aperture of each adjacent end of the panels may comprise an elongate channel, said male connector comprises an elongate body having a portion adapted to be inserted into said elongate channel defined by each receiving aperture, said at least one resilient retaining member defining a side of said elongate body.

Said male connector may comprise a base region and a pair of distal end regions on either side of the base region, said at least one retaining member of each end of the male connector comprising an outwardly flared resilient wing extending from said respective distal end region towards said base region, a distal end of said resilient wing being adapted to engage a shoulder within the respective receiving aperture into which the respective end of the male connector is inserted to retain said end of the male connector in said receiving aperture.

In one embodiment the retaining means of at least one end of said male connector comprises a pair of outwardly flared symmetrically arranged resilient wings provided on either side of a central rib or web such that said wings define a substantially arrow head shaped cross section, distal ends of said resilient wings being adapted to engage respective opposing shoulders within the respective receiving aperture into which the respective end of the male connector is inserted to retain said end of the male connector in said receiving aperture.

In an alternative embodiment the retaining means of at least one end of said male connector comprises a resilient wing provided on a first side of said at least one end of the male connector, a second, opposite side of said at least one end of the male connector defining a curved outer face extending between said base and distal end region of said at least one end of the male connector. Preferably said resilient wing extends from an outer end of said second side of the male connector.

In a preferred embodiment the or each resilient wing is curved outwardly between said respective distal end region and said base region of the respective end of the male connector.

Said receiving apertures may be formed in respective female connector members located in respective recesses in the free ends of said adjacent panels. Barbs, hooks, teeth or similar retaining formations may be formed on an outer surface of each of said female connector members for retaining said female connector member within its respective receiving recess.

In one embodiment at least one end of said male connector comprises a curved side having a radius substantially equal to the distance of said curved side from an adjacent corner of the article of furniture defined by adjacent folded panels such that the male connector may be inserted into the receiving apertures of said abutting ends of adjacent panels.

In an alternative embodiment at least one end of said male connector comprises a side arranged substantially tangentially to a curve having a radius substantially equal to the distance of said curved face from an adjacent corner of the article of furniture defined by adjacent folded panels such that the male connector may be inserted into the receiving apertures of said abutting ends of adjacent panels.

An opening may be provided in a side region of at least one of said receiving apertures, a tool being insertable into said opening to engage said retaining member of the respective end of the male connector member located therein in order to release the retaining means, permitting removal of the male connector from the receiving aperture. Said opening may extend substantially perpendicular to an outer surface of said retaining member.

According to a further aspect of the present invention there is provided a ready to assemble article of furniture comprising a plurality of substantially rigid panels attached together end to end, the ends of the panels being bevelled or otherwise shaped such that the panels can be folded to bring said ends into abutting relationship to define a polygonal article.

Said polygonal article may comprise a storage unit for storing articles within a hollow space defined by said assembled panels.

Preferably said panels are attached together by means of a flexible sheet material extending between the panels. Preferably said flexible sheet material comprises webbing, tape, fabric or similar thin flexible sheet like material. Said flexible sheet material may comprise a single elongate sheet of material attached to the outer faces of the panels to extend between the panels to define an outer surface of the assembled storage unit. Said flexible sheet material may be removable from the panels to allow said material to be removed once the panels have been assembled to define said storage unit.

Alternatively the panels may be connected together by hinge means, such as two part mechanical hinges or integrally formed one part live hinges.

Preferably a first connector assembly is provided for connecting the free ends of the panels together when assembled. Further connector assembly may further be provided between the abutting ends of the panels to secure the panels in their folded assembled position.

Preferably said first and/or further connector assemblies are in accordance with the first embodiment of the present invention described above.

A bevelled slot or channel may be provided along one side of each panel for receiving a correspondingly bevelled rear panel of the assembled article of furniture, the bevelled shape of the slot enabling the rear panel to be inserted and the panels assembled so that the rear face of the rear panel lies flush with the rear sides of the panels. Such arrangement avoids the formation of a gap between a rear panel of an assembled storage unit and the rear edges of the sides of the unit to retain the rear panel within its receiving slot by bevelling the edges of the rear panel and correspondingly bevelling the receiving slots in the side panels to enable the rear face of the rear panel to lie flush with the rear edges of the side panels of the unit.

Preferably a plurality of said assembled polygonal articles may be stacked or otherwise placed together to define a larger article of furniture. Connection means may be provided for connecting said article together. In one embodiment said connection means comprises a connector strip having a planar front face and projections formed on a rear face thereof to be received in cooperating formations formed in a front side of adjacent panels of adjacent articles. Preferably said cooperating formations of each panel comprises an elongate channel or groove formed in said front side of each panel, each connector strip having a pair of spaced apart parallel elongate ribs extending from a rear face thereof, a first of said pair of ribs being received in a channel in a front side of a panel of a first article and a second of said pair of ribs being received in a channel in a front side of a panel of a second article abutting said panel of said first article to join said first and second articles together.

BRIEF DESCRIPTION OF THE DRAWINGS

An embodiment of the present invention will now be described by way of example only, with reference to the accompanying drawings, in which:—

FIG. 11 is a detailed sectional view of one of the connector assemblies of FIG. 9 in an assembled configuration;

FIG. 12 is a detailed sectional view of a portion of one of the connector assemblies of FIG. 9 in an exploded configuration;

FIG. 13a is an end view of the male connector member of the connector assembly of FIG. 9;

FIG. 13b is a side view of the male connector member of the connector assembly of FIG. 9;

FIG. 13c is a perspective view of the male connector member of the connector assembly of FIG. 9;

FIG. 16 is a perspective view of a female connector member of a connector assembly in accordance with an embodiment of the present invention;

FIG. 17 is a perspective view of a modified female connector member of a connector assembly in accordance with an embodiment of the present invention;

FIG. 18 is an exploded view of a further modified female connector member of a connector assembly in accordance with an embodiment of the present invention;

FIG. 19 is a transverse sectional view through the female connector member of FIG. 18;

FIG. 20 is a longitudinal sectional view through the female connector member of FIG. 19;

FIGS. 21a and 21b are transverse sectional views taken through a female connector member of the connector assembly of FIG. 1;

FIGS. 22a and 22b are transverse sectional views taken through a female connector member of the connector assembly of FIG. 9;

FIGS. 23a and 23b are transverse sectional views of the female connector member of FIG. 17;

FIG. 24 is a detailed view of a retaining barb of the connector assembly of FIG. 17;

DETAILED DESCRIPTION OF THE PREFERRED EMBODIMENTS

Figure 1:
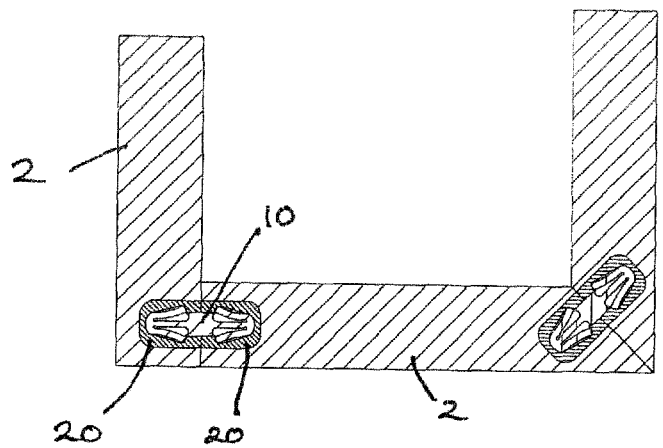
FIG. 1 is a detailed sectional view of an article of furniture comprising a plurality of panels connected together by means of a pair of connector assemblies in accordance with an embodiment of the present invention.
Figure 2:
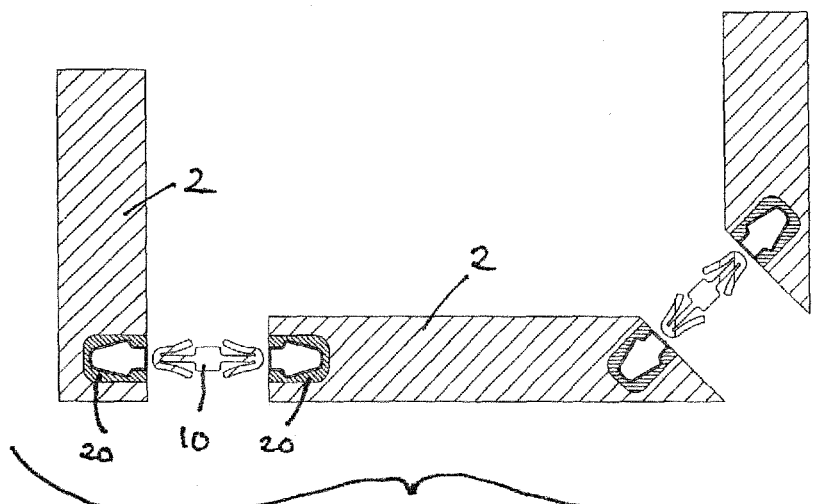
FIG. 2 is an exploded view of the panels and connector assemblies of FIG. 1.
Figure 3:
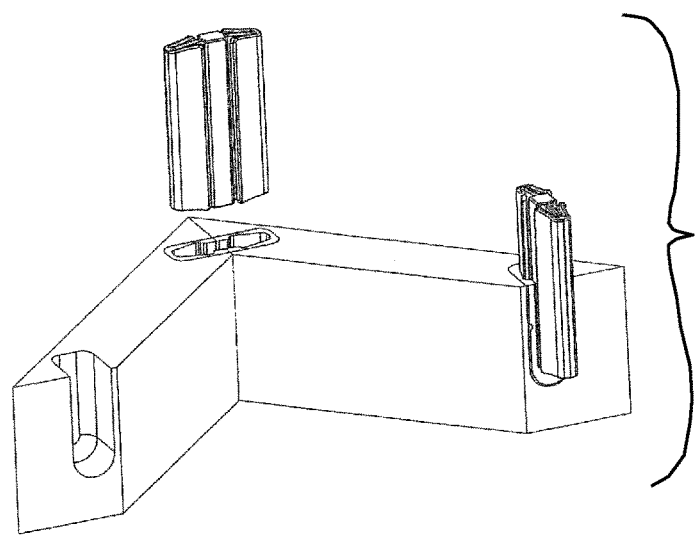
FIG. 3 is an exploded perspective view of a portion of an article of furniture incorporating connector assemblies of FIG. 1.
Figure 4:
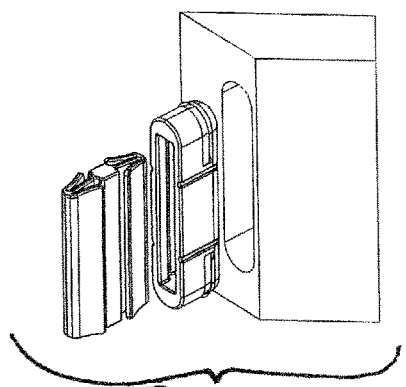
FIG. 4 is a detailed exploded view of a portion of one of the connector assemblies of FIG. 1.
Figure 5:
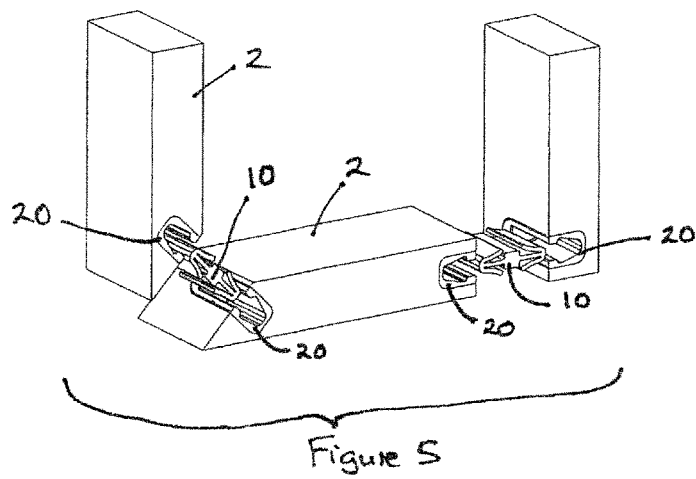
FIG. 5 is a further exploded view of an article of furniture incorporating the connector assemblies of FIG. 1.
Figure 6A:
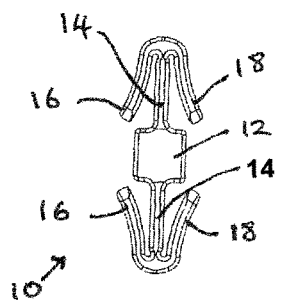
FIG. 6a is an end view of the male connector member of the connector assembly of FIG. 1.
Figure 6B:
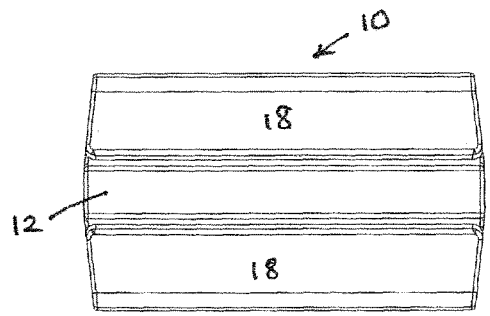
FIG. 6b is a side view of the male connector member of the connector assembly of FIG. 1.
Figure 6C:
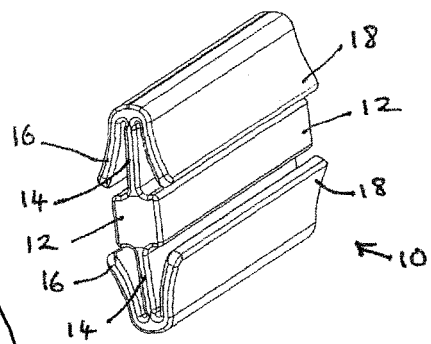
FIG. 6c is a perspective view of the male connector member of the connector assembly of FIG. 1.
Figure 7:
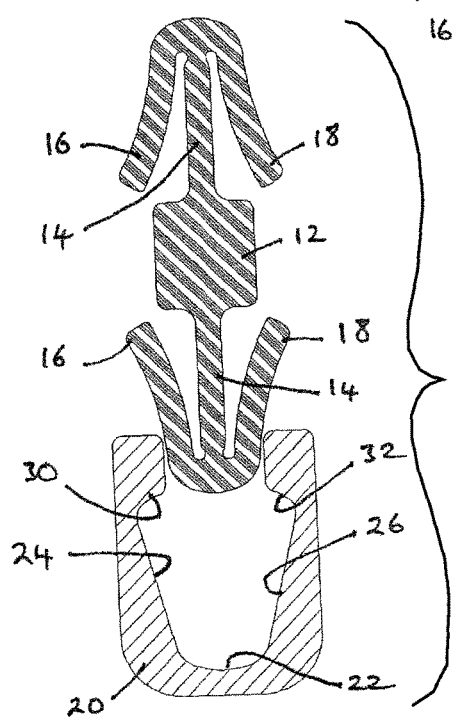
FIG. 7 is an exploded sectional view of a portion of one of the connector assemblies of FIG. 1.
Figure 8:
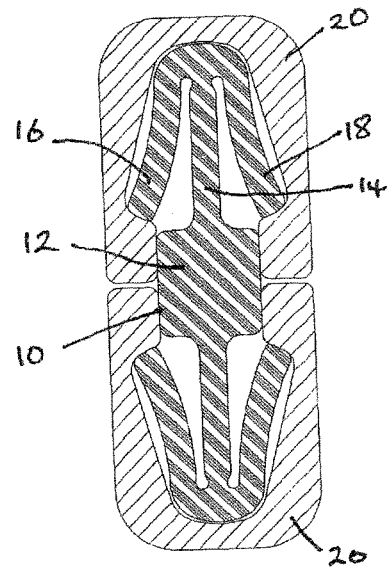
FIG. 8 is a sectional view of one of the connector assemblies of FIG. 1 in an assembled configuration.
Figure 9:
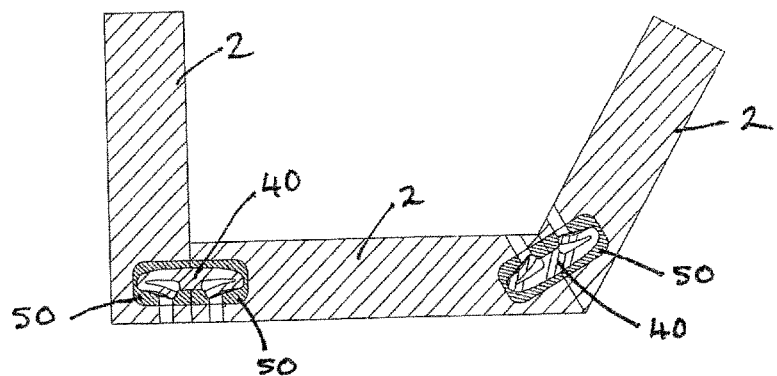
FIG. 9 is a detailed sectional view of an article of furniture comprising a plurality of panels connected together by means of a pair of connector assemblies in accordance with a further embodiment of the present invention.
Figure 10:
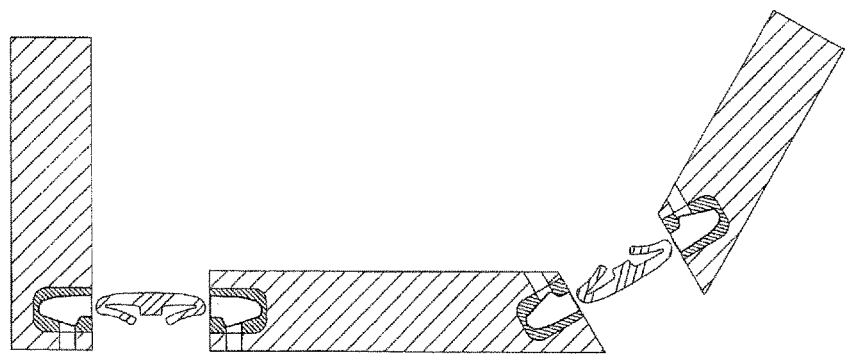
FIG. 10 is an exploded sectional view of the article of furniture of FIG. 9.

A connector assembly for connecting the free ends of the adjacent panels 2 of a ready to assemble article of furniture together when assembled in accordance with a first embodiment of the present invention is illustrated in FIGS. 1 to 8.

The connector assembly comprises a male connector member 10 comprising an elongate body having a common central base region 12, first and second central ribs 14 extending outwardly from the base region 12 on either side thereof, a distal end of each central rib 14 supporting a respective pair of outwardly flared symmetrically arranged resilient wings 16,18 on either side thereof, said wings 16,18 extending towards the base region 12, each pair of resilient wings 16,18 having a substantially arrow head shaped cross section extending on either side of the base region 12. Each wing 16,18 is curved in an outwards direction away from the respective central rib 14.

A female connector member 20 is inserted into a respective receiving recess in adjacent abutting faces of adjacent panels 2 to be connected together, each female connector member 20 having a channel having a base 22, a pair of diverging sides 24,26 extending from the base 24 and a narrowed neck region 26, a pair of opposing shoulders 30,32 being defined between said diverging sides 24,26 and narrow neck region 26.

Each end of the male connector member 10, more specifically the resilient wings 16,18 thereof, is adapted to be received within a respective female connector member 20, the resilient wings 16,18 being resiliently displaceable towards to the respective central rib 14 to enable the wings 16,18 to pass through the narrowed neck region 28 of the respective female connector member 20, the ends of the resilient wings 16,18 engaging the shoulders 30,32 of the respective female connector member 20 once the male connector member 10 has been inserted therein to retain the male connector member 10 therein.

This arrangement allows the panels 2 of an article of furniture to be fitted together in snap fit manner without the use of tools.

The outward curvature of each resilient wing 16,18 ensures that the connector assembly resists any forces attempting to pull the connector assembly apart, such forces causing the wings 16,18 to bend outwardly, ensuring that the ends of the wings 16,18 remain firmly located behind the respective shoulders 30,32 of the female connector member 20. The curvature provided a resilience to the wings 16,18 such that the ends of the male connector member is effectively sping loaded within the respective female connector members.

A modified connector assembly is illustrated in FIGS. 9 to 15, wherein the male connector member 40 has a curved outer side wall 42, defining a curved outer side face of the male connector member 40, and a single resilient wing 44 extending from an end of the curved side wall 42 towards a central base region 46 of the male connector member 40.

A corresponding female connector member 50 is provided having a correspondingly shaped channel, having a first side 52 shaped to correspond to the curved side wall 42 of the male connector member 40 and a second side 54 having a shoulder 56 to be engaged by an end of a respective resilient wing 44 of the male connector member 40 to retain the male connector member 40 within the female connector member 50.

Such connector assembly may be used with an article of furniture having panels 2 may be folded to an assembled configuration, wherein the curved side wall 42 of the male connector member 40 enables the male connector member 40 to pass into the receiving channel of the respective female connector member 50 mounted in an end face of a panel 2 as the panels 2 are folded to bring the ends of the panels 2 into abutting contact.

Figure 14:
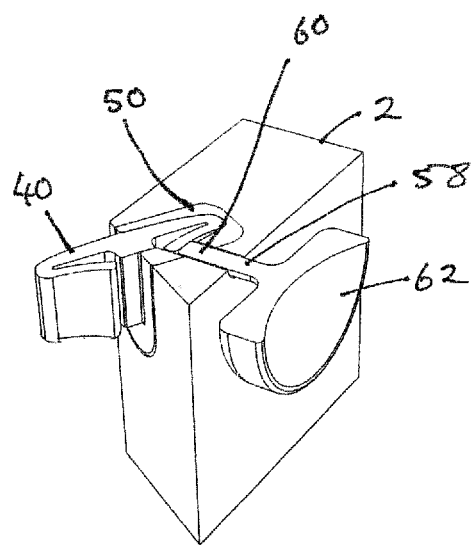
FIG. 14 is perspective view of a modified version of a portion of one of the connector assemblies of FIG. 9 and showing a release tool.
Figure 15:
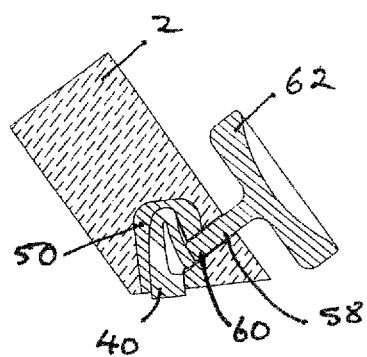
FIG. 15 is a detailed sectional view of the connector assembly and release tool of FIG. 14.

A hole 58 may be provided in a wall of one of the panels to open into a corresponding hole 60 in the second side 54 of the female connector member 50, whereby an elongate tool 62 may be inserted into the hole 60 to engage the resilient wing 44 of the male connector member 40 to enable the resilient wing 44 to be displaced inwardly to allow the male connector member 40 to be released from the female connector member 50 to permit the storage unit to be collapsed or disassembled, as best shown in FIGS. 14 and 15.

FIG. 16 shows a female connector member 20,50 to be inserted into a corresponding recess formed in a panel 2 to allow a male connector member 10,40 to be secured therein. The female connector member 20,50 may be secured within the recess by means of a suitable adhesive. Grooves or ridges may be formed in the outer sides of the female connector member 20,50 to allow the female connector member 20,50 to bed into the adhesive.

In a modified embodiment, shown in FIG. 17, barbs 64 are formed on the outer walls of the female connector member 20,50 to retain the female connector member 20,50 within a corresponding receiving aperture within an end wall of a panel 2.

In a further embodiment, shown in FIGS. 18 to 20, apertures 66 may be formed through the female connector member 20,50 adjacent either end thereof through which securing screws 68 may be passed to secure the female connector member 20,50 within a corresponding receiving aperture in an end wall of a panel 2.

FIG. 21 shows a cross section through a female connector member 20 for receiving the male connector member 10 of FIGS. 1 to 8, the channel within the female connector member 20 having a substantially arrow head cross section.

FIG. 22 shows a cross section through a female connector member 50 for receiving the male connector member 40 of FIGS. 9 to 15, having a first curved side 52 and a second side 54 having a shoulder 56 for engagement with a respective resilient wing 44 of the male connector member 40.

FIG. 23 shows a cross section through a female connector member 20 having retaining barbs 64 formed on the outer sides thereof for retaining the female connector member 20 within a corresponding recess in an end wall of a panel 2. FIG. 24 is a detailed section view showing one of the barbs 64. As can be seen, the barbs 64 are arranged to permit easy insertion of the female connector member 20 into a receiving aperture within an end wall of a panel 2, while preventing removal of the female connector member 20 therefrom.

Figure 25:
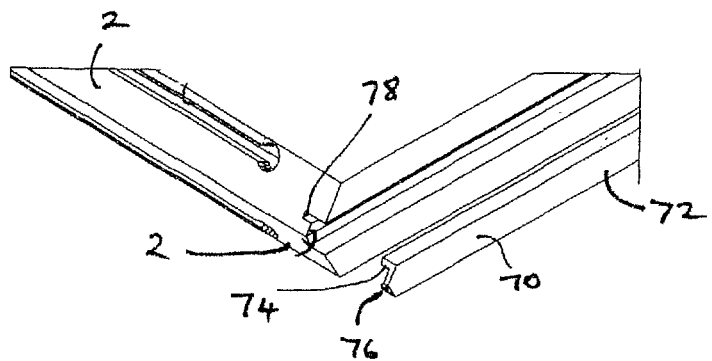
FIG. 25 is a detailed perspective view of a connector assembly for interconnecting a plurality of storage units in accordance with an embodiment of the present invention.

In order to secure the assembled units together, elongate connector strips 70 are provided, as shown in FIG. 25, each strip 70 having a flat front face 72 and a pair of parallel elongate ridges 74,76 on a rear face thereof, said ridges 74,76 being receivable in a respective corresponding slots 78,80 provided on a front side of each panel so that abutting panels 2 of adjacent storage units 6 can be secured together by locating a connector strip 70 to extend between the abutting panels 2 of the adjacent units 6 such that each of the parallel ridges 74,76 on the connector strip 70 engage a respective slot 78,80 in the front faces of the abutting panels. The edge face of the front side of each panel 2 adjacent the connector receiving slot 78,80 is recessed so that the front face 72 of the connector strip 70, when the connector strip 70 is attached to the panels 2, lies flush with the front of the assembled units 6 or is slightly recessed with respect to the front of the assembled units 6.

Figure 26:
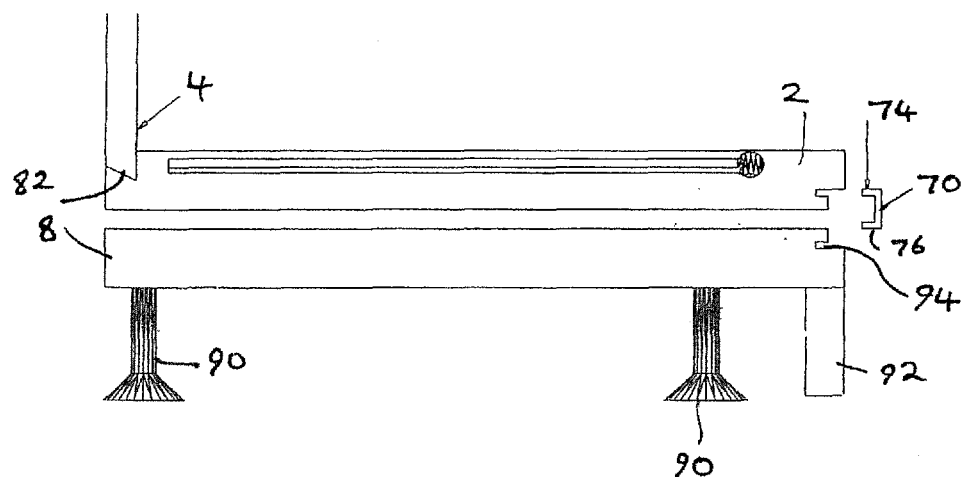
FIG. 26 is a sectional end view showing a connector assembly and base of the assembly of FIG. 25.
Figure 27:
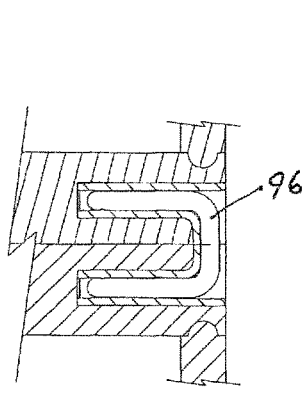
FIG. 27 is a sectional view of a connector assembly for interconnecting a plurality of storage units in accordance with an embodiment of the present invention.
Figure 28:
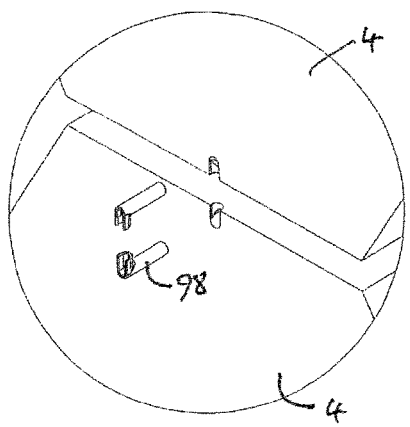
FIG. 28 is an exploded view of a female connector member of the connector assembly of FIG. 27.
Figure 29:
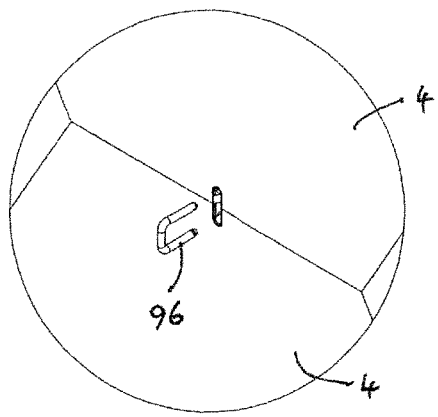
FIG. 29 is an exploded view of a male connector member of the connector assembly of FIG. 27.
Figure 30A:
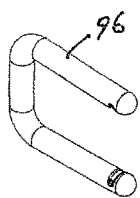
FIG. 30a a perspective view of the male connector member of the connector assembly of FIG. 27.
Figure 30B:
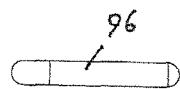
FIG. 30b is a top view of the male connector member of the connector assembly of FIG. 27.
Figure 31A:
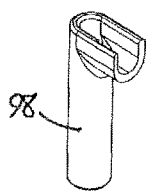
FIG. 31a is a perspective view of the female connector member of the connector assembly of FIG. 27.
Figure 31B:
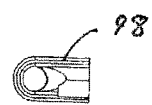
FIG. 31b is a top view of the female connector member of the connector assembly of FIG. 27.
Figure 30C:
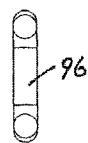
FIG. 30c is an end view of the male connector member of the connector assembly of FIG. 27.
Figure 30D:
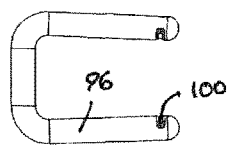
FIG. 30d is a side view of the male connector member of the connector assembly of FIG. 27.
Figure 31C:
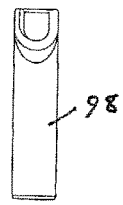
FIG. 31c is an end view of the female connector member of the connector assembly of FIG. 27.
Figure 31D:
FIG. 31d is a side view of the female connector member of the connector assembly of FIG. 27.
Figure 31E:
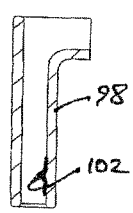
FIG. 31e is a side sectional view of the female connector member of the connector assembly of FIG. 27.

As can be seen from FIG. 26, a bevelled slot 82 is formed along a rear side of each panel 2 for receiving a correspondingly bevelled rear panel 4 of the assembled unit 6, the bevelled shape of the slot 82 enabling the rear panel 4 to be inserted and the panels 2 assembled so that the rear face of the rear panel 4 lies flush with the rear sides of the panels 2. Such arrangement avoids the formation of a gap between the rear panel 4 of the assembled storage unit 6 to enable the rear face of the rear panel 4 to lie flush against a surface against which the storage unit 6 may be placed.

As shown in FIG. 26, base member may be provided for supporting the units 6. The base member comprises a planar base panel 8 having adjustable support legs 90 mounted on a lower face thereof. A plinth 92 is mounted on a front edge of the base panel 8 to fill the gap between the base panel 8 and the floor. As with the panels 2 forming each modular storage unit 6, a front side of the base panel 8 is provided with one or more elongate slots 94 adjacent its upper face to receive a respective ridge of a connector strip 70 to connect the base panel 8 to a lowermost panel of a storage unit 6 supported thereon. The length of the base panel 8 may be sufficient to support a plurality of storage units 6 in side by side relationship along an upper surface of the base panel 8 of the base member.

FIGS. 27 to 31 show a connector assembly for linking individual furniture/storage units 6 together comprising a substantially U shaped clip 96 received within apertures provided in the end faces of the rear side of adjacent panels 2 of adjacent units 6 to be connected. The apertures are defined by moulded female connector members 98 which may be received within corresponding mounting recesses/holes in the panels 2.

The legs of the U shaped clip 96 may converge towards one another in order to provide a resilient biasing force to hold the adjacent units 6 together as the legs are displaced to a substantially parallel configuration when the clip 96 is inserted into its receiving apertures 98 in the adjacent units. A recess 100 may be provided adjacent an end of each leg of the clip 96 to receive a projection 102 in the respective female connector member 98 to positively lock each leg of the clip 96 in the respective female connector member 98.

Figure 32:
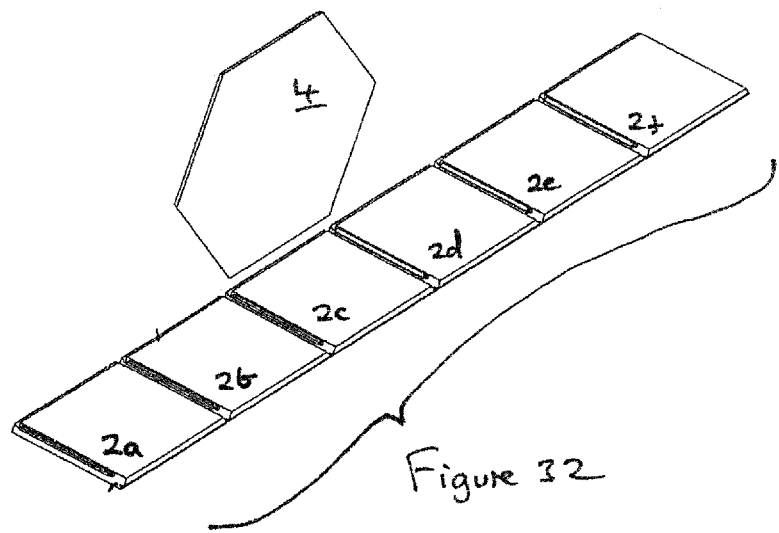
FIG. 32 shows a ready to assemble storage unit in accordance with an embodiment of the present invention in a disassembled configuration.
Figure 33:
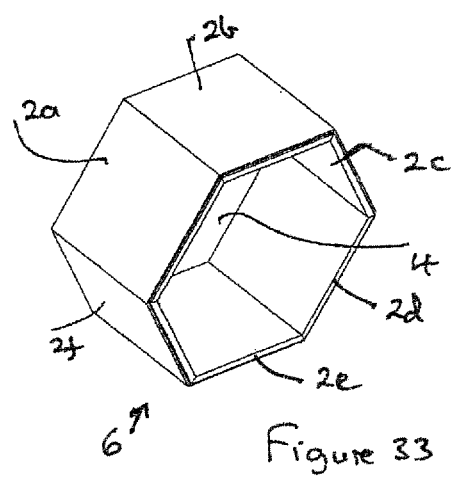
FIG. 33 shows the storage unit of FIG. 32 in an assembled configuration.

A ready to assemble modular storage unit utilising a connector assembly in accordance with an embodiment of the present invention is illustrated in FIGS. 32 and 33 with the general reference numeral 6. The storage unit 6 comprises six panels 2a,2b,2c,2d,2e,2f joined end to end by means of a sheet of flexible material, such as a fabric, applied to the faces of the panels 2 defining outer faces of the assembled unit.

Adjacent ends of each panel 2 are bevelled so that the panels 2 can be folded until the bevelled ends abut one another to bring the unit 6 into an assembled configuration, whereby the panels 2 define a hollow hexagonal structure, as shown in FIG. 33.

To retain the panels 2 in their assembled configuration, a connector assembly as shown in FIGS. 9 to 15 may be used to connect adjacent ends of the panel 2 together to secure the panels 2 in an assembled configuration. The curved side walls 42 of the male connector members 40 allow the panels 2 to be folded until the ends of the male connector members 40 are engaged with the respective female connector member 50 as the panels 2 are folded to their assembled configuration.

Figure 34:
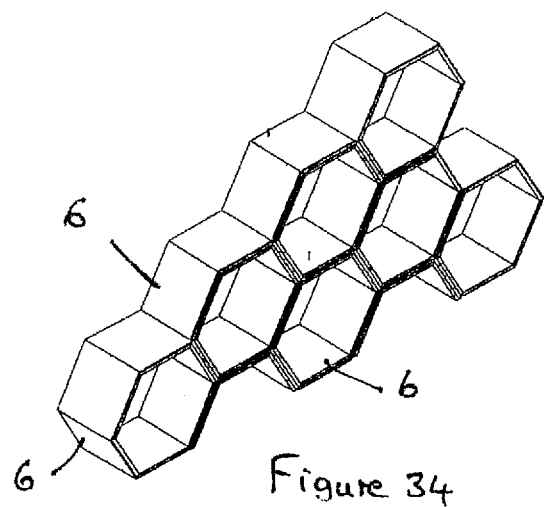
FIG. 34 shows an assembly comprising a plurality of the storage units of FIG. 32 assembled to comprise an article of furniture.

As shown in FIG. 34, a plurality of the assembled hexagonal storage units 6 may be stacked on top of one another to produce a modular storage unit of any desired size, each individual unit comprising a separate storage compartment of the complete assembly. The units may be secured together using the connector assembly shown in FIGS. 25 and 26 and/or 27 to 31.

Figure 35:
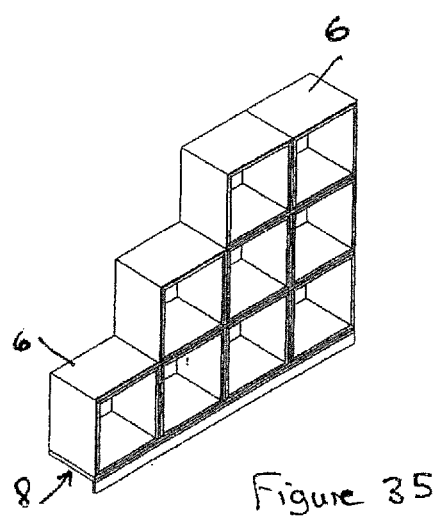
FIG. 35 shows an assembly comprising a plurality of the storage units in accordance with an alternative embodiment of the invention assembled to comprise an article of furniture.

The number of panels 2 from which each storage unit 6 is comprised may be varied to vary the shape of the assembled unit, the angle of the bevelled ends of the panels 2 being adjusted accordingly to suit the angle between the panels of the assembled unit. In the embodiment shown in FIG. 35, each storage unit 6 is comprised of four panels 2a,2b,2c,2d to define square units when the panels are assembled.

Figure 36:
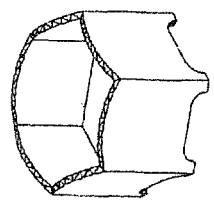

A shown in FIGS. 36 to 39, different articles of furniture and different shaped modular storage units may be produced by changing the number of panels 2 and the sizes of the panels 2 from which the article is made and by varying the angles of the bevelled ends of the panels. FIG. 36 shows an embodiment wherein the article, when in its assembled configuration, defines a plant holder. In the embodiment shown in FIG. 37 the article comprises a square storage unit formed from four panels, provided with dividers to define a modular wine rack.

Where the panels are separate from one another prior to assembly the connector assembly of FIGS. 1 to 8 may be used instead of the connector assembly of FIGS. 9 to 15 because the male connector members 10 do not then need to accommodate folding of the panels 2.

Figure 39:
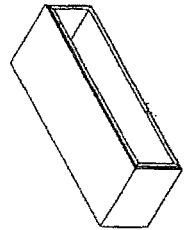
FIGS. 36 to 39 are perspective views of articles of furniture in accordance with further alternative embodiments of the present invention in their assembled configurations.
Figure 38:
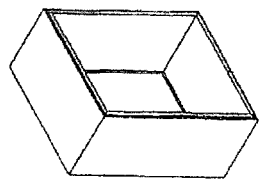
Figure 37:
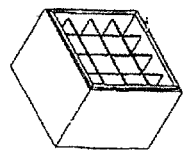

FIG. 38 shows a tall rectangular storage unit formed from four panels. Shelves may be fitted into the storage unit. FIG. 39 shows a flatter narrower storage unit formed from two short panels and two longer panels.

It is envisaged that a male connector member may be provided having a first end formed with a pair of symmetrical resilient wings, as shown in FIGS. 1 to 8, and a second, opposite end having a curved side and a single resilient wing, as shown in FIGS. 9 to 15.

While the connector assembly of the present invention has been described in relation to a ready to assemble/self assembly article of furniture, it is envisaged that such connector assembly may be utilised to interconnect a wide variety of articles, such as in automotive assemblies, or any other application where it is desired to couple to connect two articles in a rapid and reliable manner without requiring the use of tools. The connector assembly in accordance with the present invention may be used on all types of self assembly furniture wherein butting panels need to be attached to one another.

The invention is not limited to the embodiment(s) described herein but can be amended or modified without departing from the scope of the present invention.

The invention claimed is:

1. A connector assembly for connecting free ends of adjacent panels of a ready to assemble article of furniture together when assembled, said connector assembly comprising:
   a male connector having opposite ends, each opposite end being provided with a retaining element in the form of at least one resilient retaining member;
   female connector members configured to be located in respective recesses provided in the free ends of the adjacent panels, said female connector members having respective receiving apertures, and a shoulder within each said receiving aperture;
   wherein said opposite ends of said male connector are insertable into said respective opposing receiving apertures of said female connector members, and wherein said resilient retaining members are each adapted to engage the shoulder within said receiving aperture of a respective one of said female connector members to thereby retain said opposite ends of said male connectors in respective ones of said opposing receiving apertures; and
   said male connector further comprising a base and first and second ribs extending outwardly from respective opposite sides of said base, said first and second ribs terminating in respective distal end portions located at said opposite ends, said at least one retaining member comprising a pair of symmetrically arranged outwardly flared resilient wings cooperating to form a substantially arrowhead shaped cross section at each of said respective distal end portions, each of said wings curving outwardly away from a respective one of said first and second ribs to define respective open channels and comprising a respective distal end extending toward said base;
   wherein said distal end of each said resilient wing is adapted to engage a respective one of said shoulders within each said receiving aperture of said respective female connector member upon insertion of said respective opposite ends of said male connector to thereby retain said opposite ends of said male connector in said receiving apertures of said female connector members.

2. The connector assembly as claimed in claim 1, wherein each said resilient wing extends from an outer end of a respective one of said first and second ribs.

3. The connector assembly as claimed in claim 1, wherein said female connector members comprise retaining formations formed on an outer surface thereof for retaining each of said female connector members within a respective one of the receiving recesses of one of the free ends of one of the panels of the ready to assemble article of furniture, said retaining formations comprising barbs, hooks, or teeth.

4. The connector assembly as claimed in claim 1, wherein an opening is provided in a side of at least one of said female connector members, and wherein a tool is insertable into said opening to engage a respective one of said resilient wings of said end of said respective male connector located therein in order to release each said resilient wing from a respective one of said shoulders of said respective female connector member, thereby permitting removal of said male connector from said respective female connector member.

5. The connector assembly as claimed in claim 4, wherein said opening extends substantially perpendicular to an outer surface of each said resilient wing.

6. A connector assembly for connecting free ends of adjacent panels of a ready to assemble article of furniture together when assembled, said connector assembly comprising:
   a male connector having opposite end portions, each opposite end portion being provided with a retaining element in the form of a resilient retaining member;
   female connector members configured to be located in respective recesses provided in the free ends of the adjacent panels, said female connector members having respective receiving apertures each defining a shoulder therein;
   wherein said opposite end portions of said male connector are insertable into said respective opposing receiving apertures of said female connector members, and wherein said resilient retaining members are each adapted to engage said shoulder within said receiving aperture of a respective one of said female connector members to thereby retain said opposite end portions of said male connectors in respective ones of said opposing receiving apertures;
   said male connector further comprising a base and first and second outwardly-extending walls extending in opposite directions from respective opposite sides of said base, said first and second outwardly-extending walls terminating in respective distal ends at said opposite end portions;
   said at least one retaining member comprising a respective outwardly-flared resilient wing attached at each of said distal ends of said first and second outwardly-extending walls and extending in a direction toward said base to form a channel between each of said resilient wings and respective ones of said first and second outwardly-extending walls, said resilient wings curving outwardly away from said respective outwardly-extending wall and comprising a respective free distal wing end spaced from said respective distal end of said first or second outwardly-extending wall;
   wherein said distal end of each said resilient wing is adapted to engage a respective one of said shoulders within each said receiving aperture of said respective female connector member upon insertion of said respective opposite end portions of said male connector to thereby retain said opposite end portions of said male connector in said receiving apertures of said female connector members.

7. The connector assembly as claimed in claim 6, wherein each of said first and second outwardly-extending walls extends perpendicularly from a central region of said respective opposite sides of said base.

8. The connector assembly as claimed in claim 7, wherein said first and second outwardly-extending walls are linearly shaped, and wherein said at least one retaining member comprises a pair of said resilient wings in a symmetrical arrangement on opposite sides of each of said first and second outwardly-extending walls.

9. The connector assembly as claimed in claim 6, wherein each of said first and second outwardly-extending walls extends from a side region of said respective opposite sides of said base.

10. The connector assembly as claimed in claim 9, wherein said first and second outwardly-extending walls are curved in shape defining a curved outer side face of said male connector member.

11. The connector assembly as claimed in claim 10, wherein said outwardly-flared resilient wings comprise a single wing at each of said distal ends of said first and second outwardly-extending walls.

12. A connector assembly for connecting free ends of adjacent panels of a ready to assemble article of furniture together when assembled, said connector assembly comprising:

a male connector having opposite end portions, each opposite end portion being provided with a retaining element in the form of a resilient retaining member;

female connector members configured to be located in respective recesses provided in the free ends of the adjacent panels, said female connector members having respective receiving apertures each defining a shoulder therein;

wherein said female connector members comprise retaining formations formed on an outer surface thereof for retaining each of said female connector members within a respective one of the receiving recesses of one of the free ends of one of the panels of the ready to assemble article of furniture, said retaining formations comprising barbs, hooks, or teeth;

wherein said opposite end portions of said male connector are insertable into said respective opposing receiving apertures of said female connector members, and wherein said resilient retaining members are each adapted to engage said shoulder within said receiving aperture of a respective one of said female connector members to thereby retain said opposite end portions of said male connectors in respective ones of said opposing receiving apertures;

said male connector further comprising a base and first and second outwardly-extending walls extending in opposite directions from respective opposite sides of said base, said first and second outwardly-extending walls terminating in respective distal ends at said opposite end portions; and said at least one retaining member comprising a respective outwardly-flared resilient wing attached at each of said distal ends of said first and second outwardly-extending walls and extending in a direction toward said base and curving outwardly away from said respective outwardly-extending wall and comprising a respective distal wing end spaced from said respective distal end of said first or second outwardly-extending wall;

wherein said distal end of each said resilient wing is adapted to engage a respective one of said shoulders within each said receiving aperture of said respective female connector member upon insertion of said respective opposite end portions of said male connector to thereby retain said opposite end portions of said male connector in said receiving apertures of said female connector members.

13. The connector assembly as claimed in claim 12, wherein one of said resilient wings extends from each side of said distal end of each said first and second outwardly-extending walls.

14. The connector assembly as claimed in claim 12, wherein an opening is provided in a side of at least one of said female connector members, and wherein a tool is insertable into said opening to engage a respective one of said resilient wings located therein in order to release each said distal wing end from a respective one of said shoulders, thereby permitting removal of said male connector from said respective female connector member.

15. The connector assembly as claimed in claim 12, wherein said opening extends substantially perpendicular to an outer surface of each said resilient wing.

* * * * *